(12) United States Patent
Tsuda

(10) Patent No.: US 9,760,196 B2
(45) Date of Patent: Sep. 12, 2017

(54) TERMINAL APPARATUS, DISPLAY METHOD AND RECORDING MEDIUM

(71) Applicant: Sony Mobile Communications, Inc., Tokyo (JP)

(72) Inventor: Takamoto Tsuda, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 224 days.

(21) Appl. No.: 13/892,918

(22) Filed: May 13, 2013

(65) Prior Publication Data

US 2013/0321329 A1 Dec. 5, 2013

Related U.S. Application Data

(60) Provisional application No. 61/652,526, filed on May 29, 2012.

(51) Int. Cl.

| G09G 5/00 | (2006.01) |
|---|---|
| G06F 3/041 | (2006.01) |
| G06F 3/0487 | (2013.01) |
| G06F 3/01 | (2006.01) |
| G06F 3/0484 | (2013.01) |
| G06F 3/0488 | (2013.01) |
| G06F 3/14 | (2006.01) |

(52) U.S. Cl.
CPC ............ *G06F 3/0412* (2013.01); *G06F 3/017* (2013.01); *G06F 3/0484* (2013.01); *G06F 3/0487* (2013.01); *G06F 3/04886* (2013.01); *G06F 3/1423* (2013.01); *G06F 3/041* (2013.01); *G06F 3/1454* (2013.01); *G06F 2200/1614* (2013.01); *G06F 2200/1637* (2013.01); *G09G 2340/0492* (2013.01)

(58) Field of Classification Search
CPC ............................... G06F 3/0412; G06F 3/041
USPC ...... 345/156–178, 1.1–1.3; 178/18.01–20.04
See application file for complete search history.

(56) References Cited

U.S. PATENT DOCUMENTS

| 2010/0194682 A1* | 8/2010 | Orr et al. ...................... 345/156 |
| 2011/0191516 A1* | 8/2011 | Xiong et al. .................. 710/305 |
| 2012/0206319 A1* | 8/2012 | Lucero et al. ................. 345/1.3 |
| 2012/0287058 A1* | 11/2012 | Lee ............................... 345/173 |

FOREIGN PATENT DOCUMENTS

| CN | 102244676 A | 11/2011 |
| JP | 2009-010587 | 1/2009 |

OTHER PUBLICATIONS

U.S. Appl. No. 14/135,649, filed Dec. 20, 2013, Tokutake.
Combined Chinese Office Action and Search Report dated Jan. 3, 2017 in Chinese Patent Application No. 201310205877.X with English language translation. (16 pages).

* cited by examiner

*Primary Examiner* — Hang Lin
(74) *Attorney, Agent, or Firm* — Oblon, McClelland, Maier & Neustadt, L.L.P.

(57) ABSTRACT

An information processing apparatus that controls a display disposed on a casing of the information processing apparatus to display an image; outputs, by a communication interface of the information processing apparatus, the image displayed on the display; detects an orientation of the casing; and generates different images as the image displayed on the display and the image output by the communication interface when a predetermined change of orientation of the casing is detected.

8 Claims, 13 Drawing Sheets

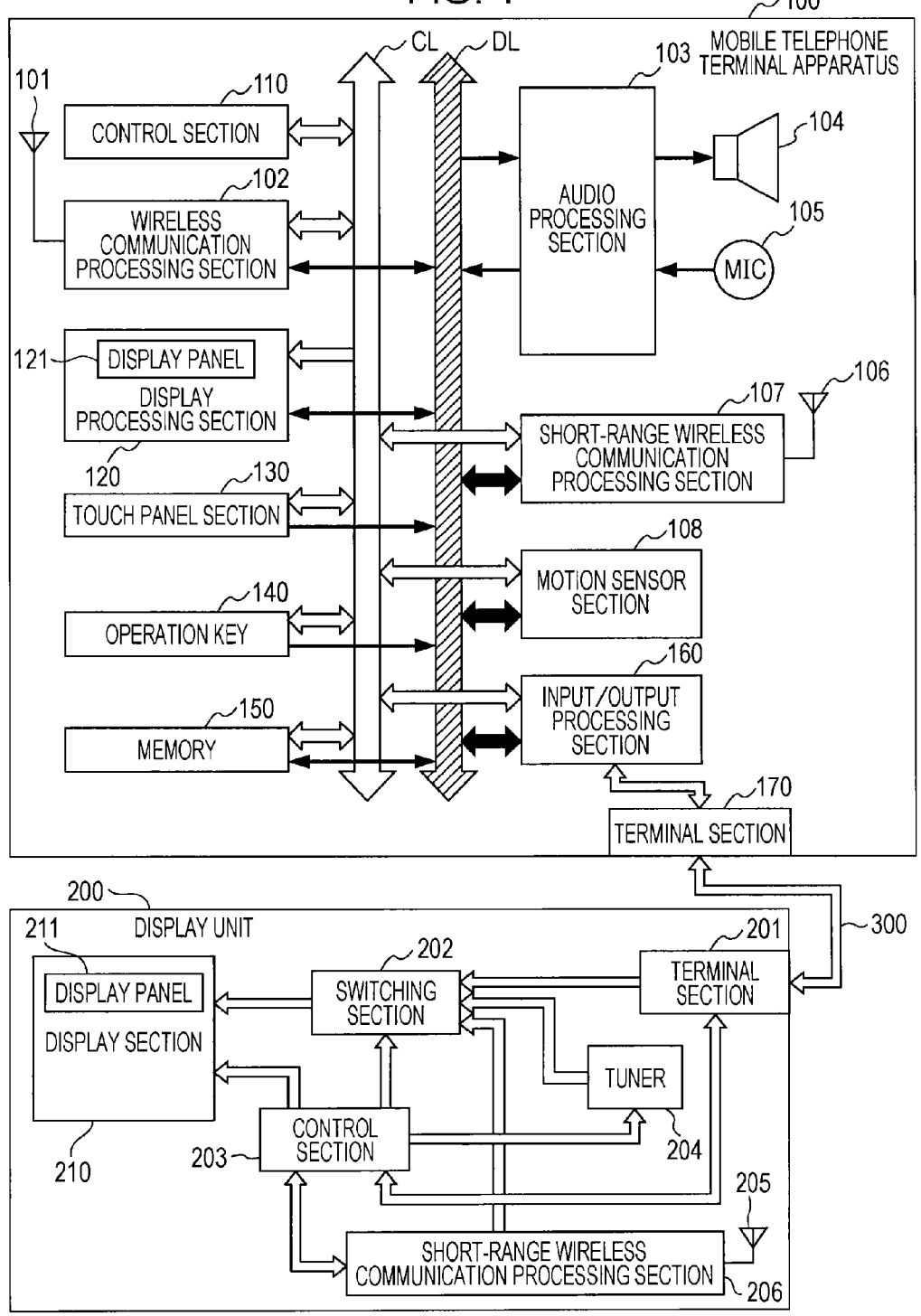

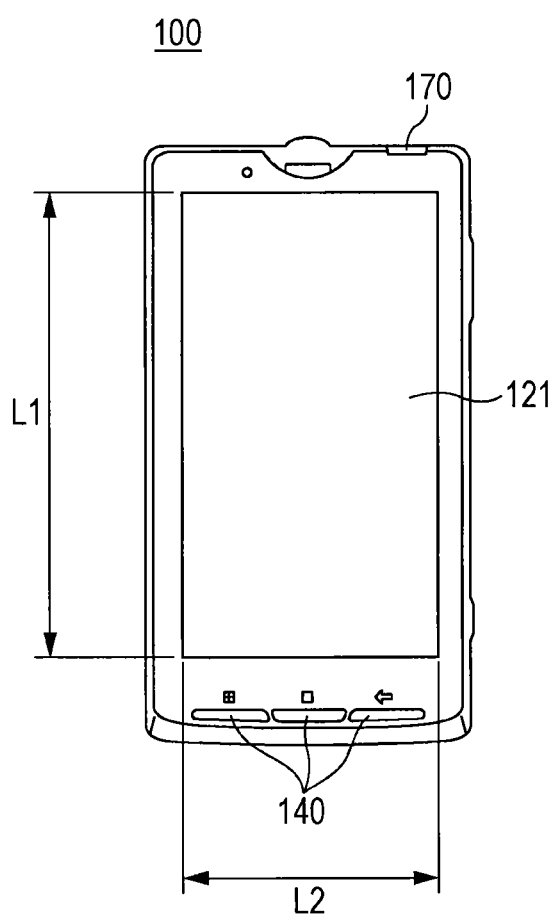

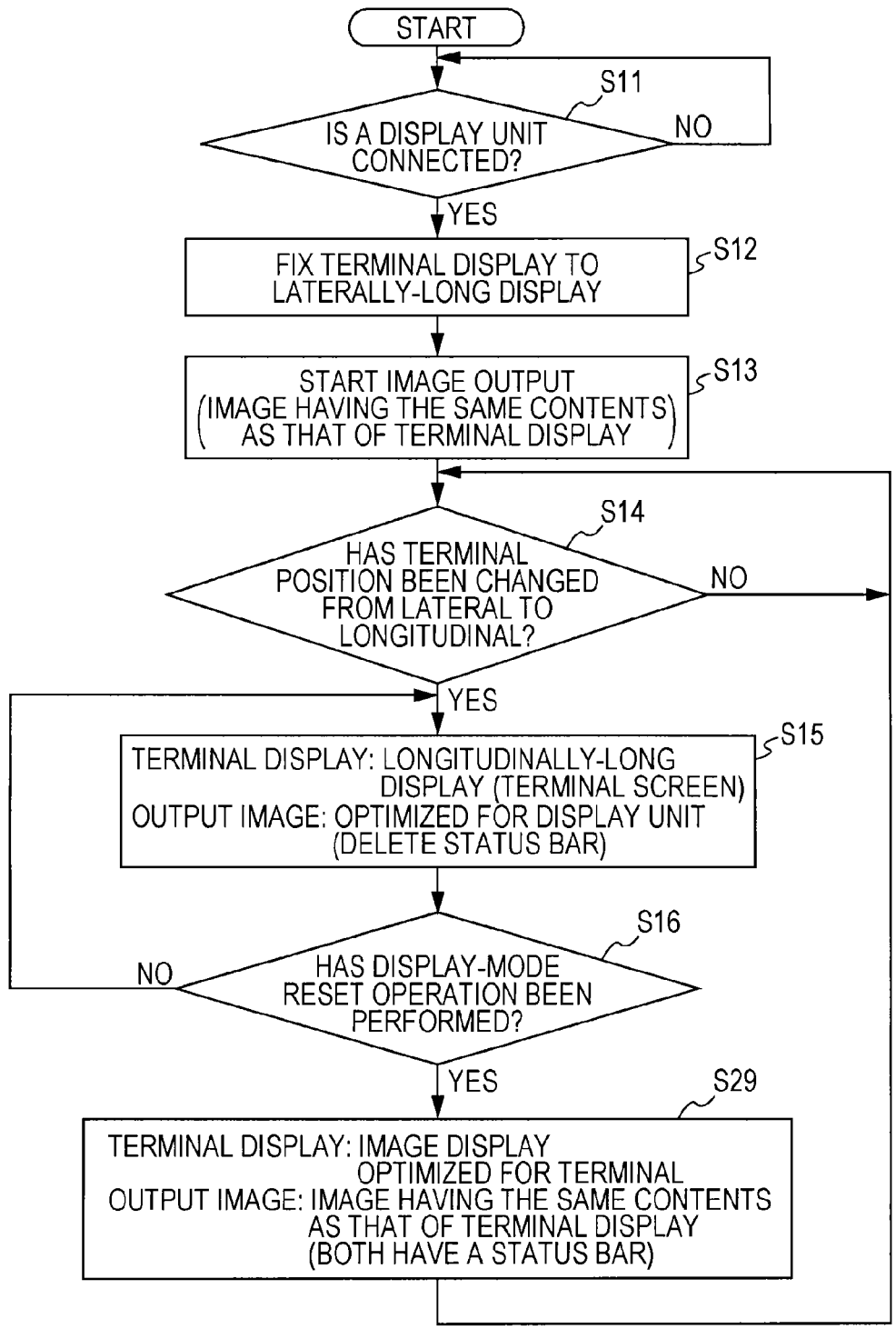

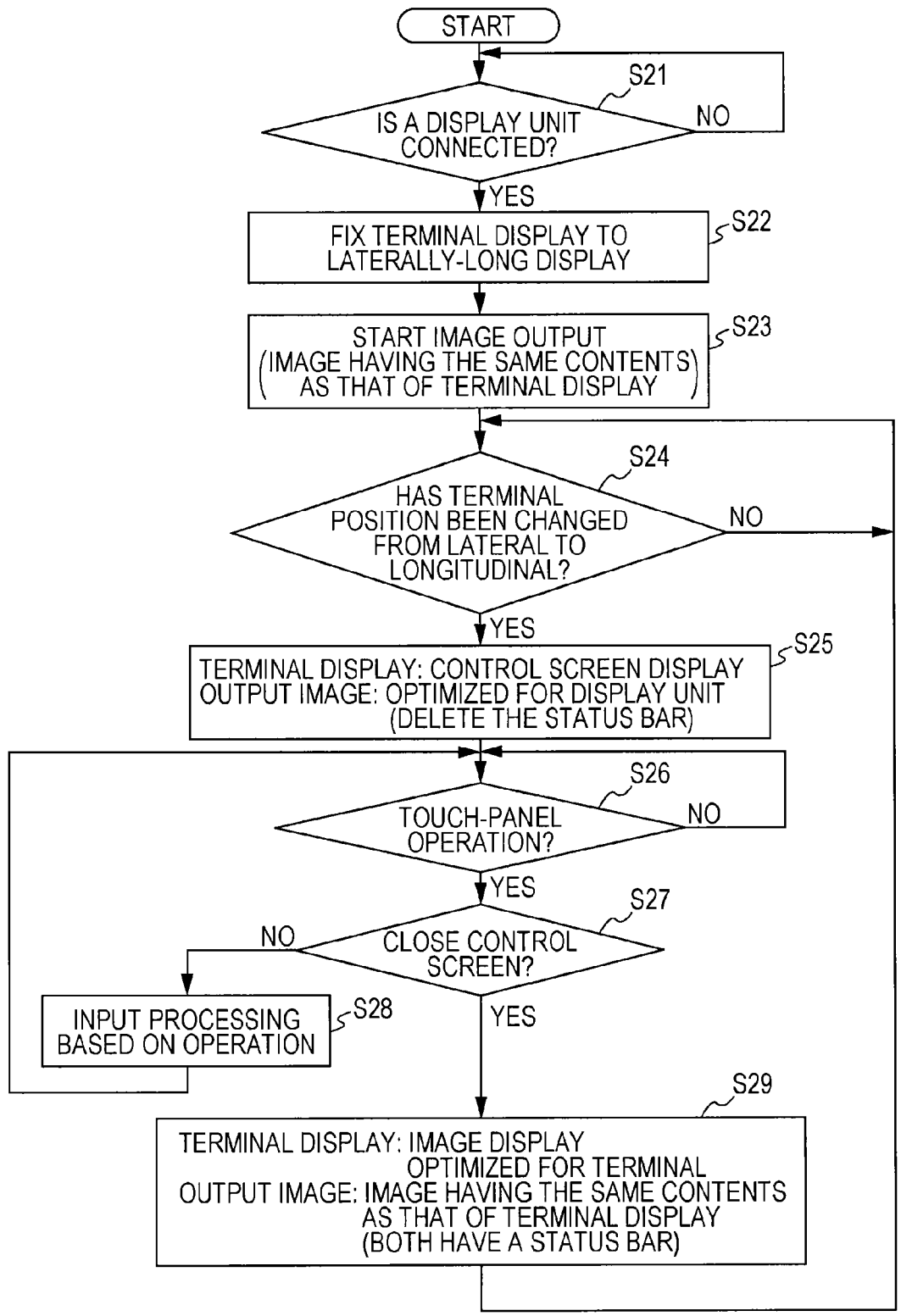

TERMINAL APPARATUS, DISPLAY METHOD AND RECORDING MEDIUM

CROSS REFERENCE TO RELATED APPLICATION

The present application claims the benefit of the earlier filing date of U.S. Provisional Patent Application Ser. No. 61/652,526 filed on May 29, 2012, the entire contents of which is incorporated herein by reference.

BACKGROUND

Field of the Disclosure The present disclosure relates to a terminal apparatus including a display section, a display method applied to the terminal apparatus, and a recording medium.

Description of Related Art

In recent years, mobile telephone terminal apparatuses having enhanced functionality, which are called smart phones, have been widespread. A smart phone is provided with a relatively high-resolution display panel, and is capable of displaying a moving image and a still image. For example, it is possible to display an image captured using a camera function included in a smart phone on a display panel with high resolution. Alternatively, a smart phone accesses the Internet so as to allow the display panel to display images obtained from various homepages.

Also, some smart phones are provided with a video output terminal. The video output terminals disposed on a smart phone include an interface terminal for an HDMI (High-Definition Multimedia Interface) standard, for example. An HDMI-standard terminal is a terminal for outputting high-resolution video data, for example, in which the number of pixels of one screen is 1920 pixels in the horizontal direction×1080 pixels in the vertical direction.

Such an HDMI-standard video output terminal of a smart phone is connected to a video input terminal of a display unit, such as a television receiver, a computer display, etc., using an HDMI-standard transmission cable so that the display unit is allowed to display a same image as an image that is being displayed on the display panel of the smart phone itself.

SUMMARY

Incidentally, a display panel included in a smart phone has a screen having a length of a diagonal of about 10 centimeters, for example, and is small in size. On the other hand, a display unit, such as a television receiver, a computer display, etc., includes a relatively large-sized display panel.

Accordingly, when an image that is suitable for a smart phone to display is displayed on a display unit including a large-sized display panel without change, an unsuitable image is sometimes displayed.

For example, at the time of accessing the Internet using a smart phone in order to display a specific homepage, a screen for a mobile terminal is sometimes displayed. This screen for a mobile terminal is a screen in which characters and images become suitable display sizes when the screen is displayed on a display panel having a length of a screen diagonal of about 10 centimeters, for example. When this mobile terminal screen is displayed on a large-sized display unit without change, characters and images to be displayed on the display unit are too large, and it is difficult to say that it is a suitable display.

Also, there is a problem in that if the large-sized display unit displays a mobile terminal screen without change in this manner, a display performance of the large-sized display panel possessed by the display unit is not taken advantage of. That is to say, a large-sized display unit is normally allowed to display a high-resolution image in accordance with a size of a display panel. However, there is a problem in that if a mobile terminal screen is displayed without change, such a performance of the display unit is not utilized.

On the other hand, if a normal homepage screen to be displayed on a computer display, etc., is displayed on a display panel of a smart phone, character sizes in images to be displayed on a display panel are too small, and thus it is difficult to say that it is a suitable display.

Also, if a normal homepage screen is displayed on a display panel of a smart phone, GUI (Graphical User Interface) buttons on the screen become very small representations, and thus button operations on a touch panel sometimes become difficult.

Also, in addition to display sizes and operationality, if a same screen is displayed on a mobile telephone terminal apparatus, such as a smart phone, etc., and on a television receiver or a computer display, one of the display screens is sometimes not suitable.

In the case of connecting a terminal apparatus and a display unit, and displaying same information, the inventors recognize necessity of suitably adjusting individual displays in accordance with display performances of the individual apparatuses and states of the apparatuses. Also, the inventors recognize necessity of providing new operationality by connecting a terminal apparatus and a display unit.

According to an embodiment of the present disclosure, there is provided an information processing apparatus that controls a display disposed on a casing of the information processing apparatus to display an image; outputs, by a communication interface of the information processing apparatus, the image displayed on the display; detects an orientation of the casing; and generates different images as the image displayed on the display and the image output by the communication interface when a predetermined change of orientation of the casing is detected.

By the present disclosure, when the motion sensor detects a change in the direction of the casing, by taking this opportunity, it is possible to cause the image displayed on the display panel of the terminal apparatus and the image externally outputted by the image output section to have different images, thereby the individual images can be suitably produced.

BRIEF DESCRIPTION OF DRAWINGS

FIG. 1 is a block diagram illustrating an example of configurations of a terminal apparatus and a display unit according to a first embodiment of the present disclosure.

FIG. 2 is a configuration diagram illustrating an example of an outer shape of the terminal apparatus according to the first embodiment of the present disclosure.

FIG. 5 is a flowchart illustrating an example of display processing according to the first embodiment of the present disclosure.

FIG. 7 is a flowchart illustrating an example of display processing according to a second embodiment of the present disclosure.

DETAILED DESCRIPTION

Figure 3A:
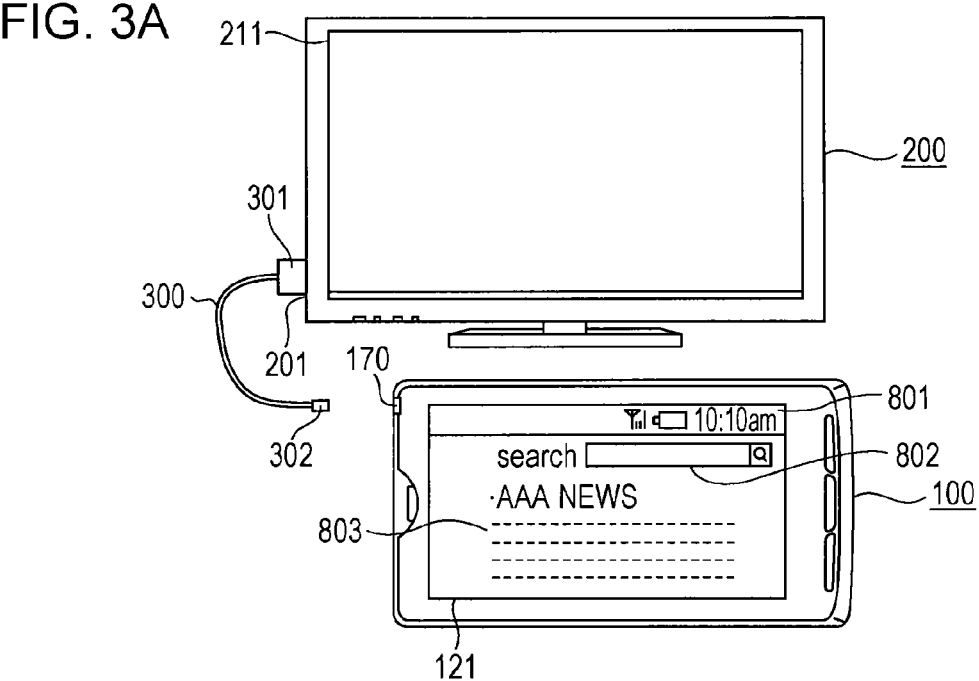
FIGS. 3A and 3B are explanatory diagrams illustrating a connection state and a display example according to the first embodiment of the present disclosure.

In the following, a description will be given of a terminal apparatus according to an embodiment of the present disclosure, an example of a display method, and a recording medium with reference to the drawings in the following order.
1. First Embodiment
1-1. Configuration of Terminal Apparatus (FIG. 1, FIG. 2)
1-2. Display Processing in Normal Mode (FIG. 3, FIG. 4)
1-3. Display processing when terminal apparatus has moved (FIG. 5, FIG. 6)
2. Second Embodiment
2-1. Display Processing when Terminal Apparatus has Moved (FIG. 7, FIG. 8)
2-2. Another Example of Control Screen (FIG. 9 to FIG. 12)
2-3. Example of Keyboard Screen (FIG. 13)
3. Variations
<1. First Embodiment>
[1-1. Configuration of Terminal Apparatus]
FIG. 1 is a diagram illustrating configurations of a mobile telephone terminal apparatus 100 and a display unit 200.

The mobile telephone terminal apparatus 100 is a terminal apparatus having enhanced functionality, for example, which is called a smart phone. The display unit 200 is, for example, a television receiver.

The mobile telephone terminal apparatus 100 includes an antenna 101 for performing wireless communication with a wireless-telephone base station. The antenna 101 is connected to a wireless communication processing section 102. The wireless communication processing section 102 performs transmission and reception processing of radio signals under the control of a control section 110. The control section 110 transmits a control command to a wireless communication processing section 102 through a control line CL. The control section 110 reads a program (software) stored in a memory 150 through the control line CL, and executes the program so as to control each section of the mobile telephone terminal apparatus 100. The memory 150 included in the mobile telephone terminal apparatus 100 stores data provided in advance, such as a program, etc., and stores data generated by a user's operation. The memory 150 stores and reads the data under the control of the control section 110.

At the time of voice communication, telephone audio data received by the wireless communication processing section 102 is supplied to a audio processing section 103 through a data line DL. The audio processing section 103 performs demodulation processing of the supplied audio data, and obtains an analog audio signal. The analog audio signal obtained by the audio processing section 103 is supplied to a speaker 104, and sound is output from the speaker 104. Also, at the time of voice communication, the audio processing section 103 converts an audio signal outputted from the microphone 105 into audio data in a transmission format. And the audio data converted by the audio processing section 103 is supplied to the wireless communication processing section 102 through the data line DL. Also, the audio data supplied to the wireless communication processing section 102 is packetized, and is radio-transmitted.

In the case of performing data communication, and email transmission and reception through a network, such as the Internet, etc., the wireless communication processing section 102 performs transmission and reception processing under the control of the control section 110. For example, data received by the wireless communication processing section 102 is stored in the memory 150, and processing, such as display based on the storage data, etc., is performed under the control of the control section 110. Also, the data stored in the memory 150 is supplied to the wireless communication processing section 102, and is radio-transmitted. If it is necessary to discard a received email, the control section 110 deletes the data stored in the memory 150.

The mobile telephone terminal apparatus 100 includes a display processing section 120. The display processing section 120 displays images and various kinds of information on a display panel 121 under the control of the control section 110. For the display panel, for example, a liquid-crystal display panel or an organic EL (Electro-Luminescence) display panel is used.

Also, the mobile telephone terminal apparatus 100 includes a touch panel section 130, and when an object, such as a finger or a pen, etc., touches a surface of the display panel 121, the touch panel section 130 detects a touch position. For the touch panel section 130, for example, a capacitive touch panel is used.

Data of the touch position detected by the touch panel section 130 is transmitted to the control section 110. The control section 110 performs an application, which has been started, on the basis of the supplied touch position.

Also, the mobile telephone terminal apparatus 100 includes operation keys 140. Operation information on the operation keys 140 is transmitted to the control section 110. In this regard, a major portion of operation on the mobile telephone terminal apparatus 100 is performed by touch panel operation using the touch panel section 130, and the operation keys 140 is used for only a part of the operation.

Also, the mobile telephone terminal apparatus 100 includes a short-range wireless communication processing section 107 to which an antenna 106 is connected. The short-range wireless communication processing section 107 performs short-range wireless communication with a neighboring terminal apparatus and an access point. The short-range wireless communication processing section 107 performs wireless communication with the other party, for example, in a range of about tens of meters by applying, for example, a wireless LAN (Local Area Network) system, which is defined as an IEEE 802.11 system.

The mobile telephone terminal apparatus 100 according to the present disclosure can transmit an image being displayed on the display panel 121 by the display processing section 120 to an external display unit through wireless communication using the short-range wireless communication processing section 107. However, as described later, an image transmitted by the short-range wireless communication processing section 107 is sometimes an image in a different display form from the image being displayed on the display panel 121.

Further, the mobile telephone terminal apparatus 100 includes a motion sensor section 108. The motion sensor section 108 includes a sensor that detects motion or a direction of the apparatus, for example, an acceleration sensor, an angular velocity sensor, a geomagnetic sensor, etc. The acceleration sensor detects accelerations in three directions, for example, longitudinal, lateral, and altitudinal directions. Data detected by this motion sensor section 108 is supplied to the control section 110. The control section 110 determines a state of the mobile telephone terminal apparatus 100 on the basis of the data supplied from the motion sensor section 108. For example, on the basis of the data supplied from the motion sensor section 108, the control section 110 determines whether the casing constituting the mobile telephone terminal apparatus 100 is in a longitudinal direction, or a lateral direction.

Also, the mobile telephone terminal apparatus 100 includes an input/output processing section 160. A terminal section 170 is connected to the input/output processing section 160, and the input/output processing section 160 performs input processing and output processing of data from and to the outside through a transmission cable 300 connected to the terminal section 170. The terminal section 170 is, for example, an output terminal for an interface of an HDMI (High-Definition Multimedia Interface) standard. The terminal section 170, which is an output terminal for the HDMI standard interface, is a terminal for outputting high-resolution video data, for example, in which the number of pixels per one screen is 1920 pixels in the horizontal direction×1080 pixels in the vertical direction, and audio data accompanying the video data, to the connected transmission cable.

The number of pixels of the video data is one example. The transmission cable 300 also complies with the HDMI standard.

The mobile telephone terminal apparatus 100 according to the present disclosure can transmit an image being displayed on the display panel 121 by the display processing section 120 to an external display unit through the transmission cable connected to the terminal section 170. However, as described later, an image outputted from the terminal section 170 is sometimes different from an image being displayed on the display panel 121. When an image being displayed on the display panel 121 and an image that is outputted from the terminal section 170 are different, the display processing section 120 performs processing for creating individual video data.

In this regard, the interface of the HDMI standard can bidirectionally transmit data other than video data, such as control data, data indicating a device state, etc. For example, as described later, when the mobile telephone terminal apparatus 100 and the display unit 200 are connected by a transmission cable, the mobile telephone terminal apparatus 100, which is a video output device, obtains data indicating a display ability of the display unit 200 (a display size, a number of display pixels, a frame frequency, etc.), which is a video input device. And the terminal section 170 of the mobile telephone terminal apparatus 100 outputs video data in a format conforming to the obtained display ability.

Next, a description will be given of a configuration of the display unit 200 illustrated in FIG. 1.

The display unit 200 is formed, for example, as a television receiver. The display unit 200 includes a terminal section 201. The terminal section 201 is assumed to be, for example, an input terminal of an HDMI-standard interface. Video data obtained by the terminal section 201 is supplied to a switching section 202. The switching section 202 selects any one of video data outputted from the terminal section 201, video data outputted from a tuner 204, and video data outputted from a short-range wireless communication processing section 206. The selection by the switching section 202 is performed under the control of the control section 203. The tuner 204 is a tuner that receives a broadcast wave of television broadcasting, etc., and obtains video data.

The short-range wireless communication processing section 206 performs short-range wireless communication with a neighboring terminal apparatus and an access point. In order to perform this short-range wireless communication, an antenna 205 is connected to the short-range wireless communication processing section 206. The short-range wireless communication processing section 206 performs communication by a same wireless communication system (for example, a wireless LAN system) as that of the short-range wireless communication processing section 107 of the mobile telephone terminal apparatus 100.

And video data selected by the switching section 202 is supplied to the display section 210. The display section 210 includes a large-sized display panel 211 as compared with the display panel 121, and performs display processing of an image on the display panel 211 on the basis of the supplied video data. In this regard, at the time of explaining operation described later, the switching section 202 of the display unit 200 is in a state of selecting an image inputted into the terminal section 201 (or an image received by the short-range wireless communication processing section 107).

FIG. 2 is a diagram illustrating an example of a shape of the mobile telephone terminal apparatus 100.

The mobile telephone terminal apparatus 100 formed as a smart phone has a longitudinally long casing having a surface on which the display panel 121 is disposed. A diagonal length of the display panel 121 is, for example, about 10 centimeters. Display on the display panel 121 is driven by the display processing section 120. Also, a touch on the surface of the display panel 121 by a finger, etc., is detected by the touch panel section 130.

As illustrated in FIG. 2, when the casing is disposed in a longitudinally-long manner, the display panel 121 has longitudinally-long screen disposition with a long side having a longitudinal length L1, and a short side having a lateral length L2. The ratio of the length L1 to the length L2 is, for example, 16:9. In the following explanation, a side of the length L1 is called a long side, and a side of the length L2 is called a short side.

Also, on the mobile telephone terminal apparatus 100, a plurality of operation keys 140 are disposed on the lower part of the surface of the longitudinally-long casing of the display panel 121. In the example in FIG. 2, three operation keys 140 are provided.

Further, on the mobile telephone terminal apparatus 100, a terminal section 170, which is an output terminal for an HDMI-standard interface, is disposed at an upper end part. This terminal section 170 has a terminal cover, and the terminal cover is removed at the time of connecting a cable.

[1-2. Display Processing in Normal Mode]

Next, a description will be given of a display example in a normal mode at the time of connecting the mobile telephone terminal apparatus 100 according to the present disclosure and the display unit 200.

As described before, the mobile telephone terminal apparatus 100 is provided with the terminal section 170, which is an output terminal for an HDMI-standard interface. Also, the display unit 200 is provided with the terminal section 201, which is an input terminal for an HDMI-standard interface. As illustrated in FIG. 3, these terminal sections 170 and 201 are connected with the transmission cable 300.

Figure 3B:
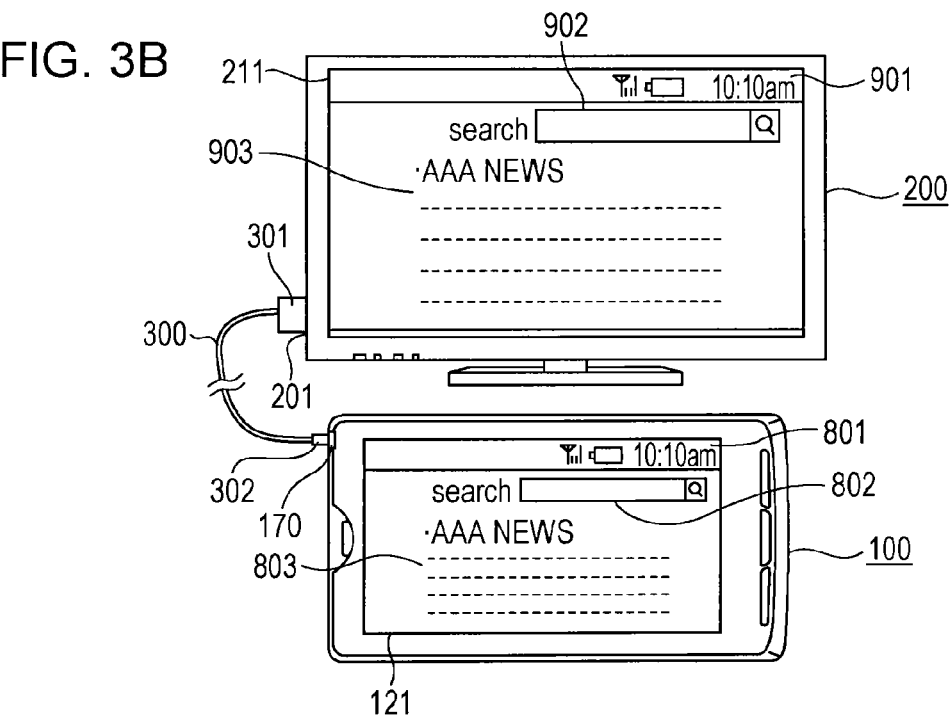

FIG. 3A is an unconnected state of the mobile telephone terminal apparatus 100 and the display unit 200 by the transmission cable 300, and FIG. 3B is a connected state of the mobile telephone terminal apparatus 100 and the display unit 200 by the transmission cable 300.

That is to say, as illustrated in FIG. 3B, one plug 301 of the transmission cable 300 is connected to the terminal section 201 of the display unit 200, and the other plug 302 is connected to the terminal section 170 of the mobile telephone terminal apparatus 100 so that video data is transmitted. In the state of FIG. 3A, the plug 302 of the transmission cable 300 is unconnected to the terminal section 170 of the mobile telephone terminal apparatus 100, and thus connection is not completed.

In the unconnected state as illustrated in FIG. 3A, an image displayed on the display panel 121 of the mobile telephone terminal apparatus 100 is not transmitted to the display unit 200. FIG. 3A illustrates an example in which an image at the time when the mobile telephone terminal apparatus 100 has accessed a predetermined Web server is displayed on the display panel 121.

On the display screen of FIG. 3A, a status bar 801 is displayed on an upper end, and a search-character input place 802 and a news display place 803, etc., are displayed as images obtained from the Web server.

The status bar 801 is for displaying information indicating a state of the mobile telephone terminal apparatus 100. Specifically, on the status bar 801, a mark indicating a reception state by the wireless communication processing section 102 of a radio wave from a base station, a mark indicating a remaining amount of a battery driving the mobile telephone terminal apparatus 100, time obtained by a clock function included in the mobile telephone terminal apparatus 100, etc., are displayed.

The search-character input place 802 is a place where a user operates the mobile telephone terminal apparatus 100 to input characters by which a Web server makes a search. At the time of inputting the characters, for example, a keyboard is displayed on the display panel 121. A display example of the keyboard will be described later.

In this regard, the display illustrated in FIG. 3A is an example, and a display other than the status bar 801 changes depending on an operation state of the mobile telephone terminal apparatus 100. For example, when the mobile telephone terminal apparatus 100 plays back a moving image content, such as a movie, etc., the played-back image is displayed on the display panel 121. In the case of displaying such a moving image content, as long as an operation mode of not displaying the status bar 801, the display panel 121 displays the status bar 801 all the time.

In a state in which the display panel 121 is performing such a display as illustrated in FIG. 3A, the mobile telephone terminal apparatus 100 is connected with the display unit 200 by the transmission cable 300 as illustrated in FIG. 3B, the display panel 211 of the display unit 200 performs the same display as the display panel 121. That is to say, as illustrated in FIG. 3B, the status bar 801, the search-character input place 802, and the news display place 803, etc., which are displayed on the display panel 121 of the mobile telephone terminal apparatus 100, are displayed on the display panel 211 of the display unit 200 without change. For example, when the display panel 211 of the display unit 200 is as large as having a diagonal length of about 100 centimeters, and the display panel 121 of the mobile telephone terminal apparatus 100 has a diagonal length of about 10 centimeters, the image is displayed by being enlarged about 10 times. In the example in FIG. 3B, the example, in which the display panel 211 of the display unit 200 displays an enlarged status bar 901, an enlarged search-character input place 902, and an enlarged news display place 903 are displayed, is illustrated.

In this manner, the mobile telephone terminal apparatus 100 and the display unit 200 perform the same display at the time of being connected by the transmission cable 300 when the operation mode of the mobile telephone terminal apparatus 100 is in a normal mode.

Also, in the mobile telephone terminal apparatus 100, if the display unit 200 is in an unconnected state, a longitudinal direction and a lateral direction are set for a display on the display panel 121 in accordance with a direction of the casing detected by the motion sensor section 108. For example, as illustrated in FIG. 2, in a longitudinally-long state in which the long side L1 of the display panel 121 is disposed substantially in the vertical direction, the display panel 121 performs a longitudinally-long image display with the long side L1 being in the vertical direction and the short side L2 being in the horizontal direction. Also, as illustrated in FIG. 3A, in a laterally-long state in which the long side L1 of the display panel 121 is disposed substantially in the horizontal direction, the display panel 121 performs a laterally-long image display with the short side L2 being in the vertical direction, and the long side L1 being in the horizontal direction. Processing for generating a display image in accordance with the direction is, for example, performed by the display processing section 120.

And in the case of a state in which the mobile telephone terminal apparatus 100 is connected to the display unit 200, whichever direction of the casing is detected by the motion sensor section 108, the display panel 121 performs a laterally-long image display with the short side L2 being in the vertical direction and the long side L1 being in the horizontal direction at the time of connection. The reason why the directions is set in this manner is that the display panel 121 matches the disposition state of the display panel 211 of the display unit 200.

In FIG. 3, a description has been given of the example in which a connection is made by a wired transmission cable 300, but it is possible to connect the mobile telephone terminal apparatus 100 and the display unit 200 by a wireless transmission path (wireless), and to transmit video data from the mobile telephone terminal apparatus 100 to the display unit 200 in the same manner.

Figure 4:
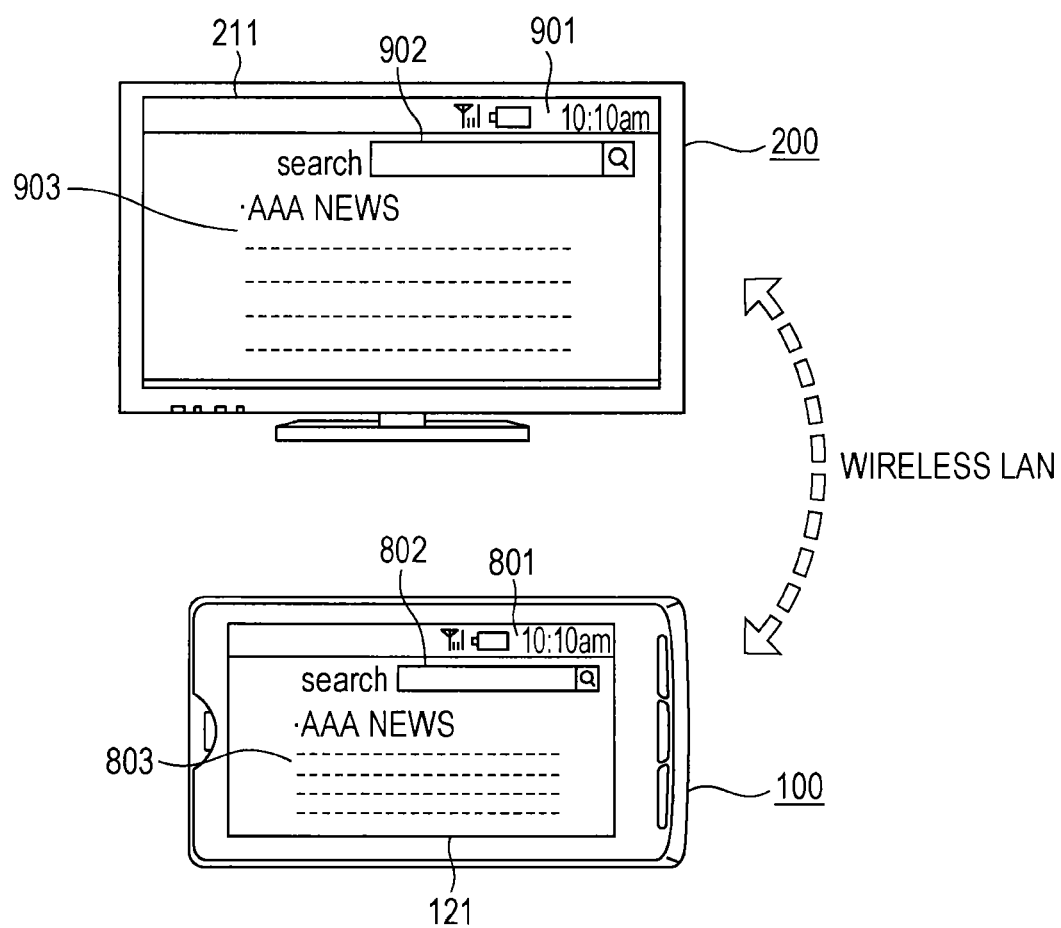
FIG. 4 is an explanatory diagram illustrating a wireless connection state and a display example according to the first embodiment of the present disclosure.

FIG. 4 is an example in which a connection is made with a wireless transmission path. That is to say, the short-range wireless communication processing section 107 of the mobile telephone terminal apparatus 100 and the short-range wireless communication processing section 206 of the display unit 200 performs wireless communication using a wireless LAN system, etc., so that it is possible to transmit video data from the mobile telephone terminal apparatus 100 to the display unit 200.

At the time of wireless transmission like this, in the same manner as the example in FIG. 3B, the display panel 211 of the display unit 200 performs the same display as the display panel 121 of the mobile telephone terminal apparatus 100.

In the following description, as illustrated in FIG. 3B, an example of the case of connecting by the transmission cable 300 will be illustrated, but, as illustrated in FIG. 4, the individual cases can also be applied in the case of wireless connections.

In this regard, in the examples in FIG. 3 and FIG. 4, a description in which the display panel 121 of the mobile telephone terminal apparatus 100 performs the same display as the display panel 211 of the display unit 200 means that the images have the same contents (information), and does not means that video data corresponding to the display images completely match. That is to say, the individual display panels 121 and 211 might be different in the number of display pixels, display frame cycle, etc. Here, a description of same images in this specification does not means a complete match of video data, such as in the number of pixels, etc., but means that a user who has viewed the display images can recognize the images having the same contents (information).

[1-3. Display Processing when Terminal Apparatus has Moved]

Next, as illustrated in FIG. 3B, a description will be given of an example of display setting processing by the individual display panels 121 and 211 in the case of connecting the mobile telephone terminal apparatus 100 and the display unit 200 by the transmission cable 300.

A flowchart in FIG. 5 is a diagram illustrating processing performed by the control section 110. First, the control section 110 determines whether or not in a state in which the display unit 200 is connected by the terminal section 170 (step S11). Here, if determined that the display unit 200 is not connected, the processing waits until a connection is detected.

And in step S11, when determined that the mobile telephone terminal apparatus 100 becomes a state of being connected to the display unit 200, an image display by the display panel 121 of the mobile telephone terminal apparatus 100 is fixed to a laterally-long display (step S12). That is to say, the image display is fixed to a laterally-long image display with the short side L2 of the display panel 121 being disposed in the vertical direction, and the long side L1 being disposed in the horizontal direction.

And the terminal section 170 starts outputting video data under the control of the control section 110 (step S13). By the output of this video data, the display panel 211 of the display unit 200 displays an image having the same contents as the image being displayed on the display panel 121 of the mobile telephone terminal apparatus 100.

In this manner, the display unit 200 performs the same display as the mobile telephone terminal apparatus 100 so that the display screen of the display unit 200 can be directly operated at the side of the mobile telephone terminal apparatus 100 by touch panel operation on the display panel 121 of the mobile telephone terminal apparatus 100. Also, in a state in which the same display is performed in this manner, the display is performed through a user interface of a screen normally displayed by the mobile telephone terminal apparatus 100 so that the user is allowed to operate the display screen with the same operationality as the case of touch operation on a single mobile telephone terminal apparatus 100. This brings about an advantage in that it is not necessary for the user to learn an operation procedure for a dedicated user-interface screen at the time of connecting the display unit 200 and the mobile telephone terminal apparatus 100 and performing operation on the display of the display unit 200.

And after the terminal section 170 has started outputting video data, the control section 110 determines a detection signal of the motion sensor section 108. The control section 110 determines whether or not the casing constituting the mobile telephone terminal apparatus 100 has been changed from the laterally-long direction to the longitudinally-long direction from the detection signal of the motion sensor section 108 (step S14). Here, if such a change from the laterally-long direction to the longitudinally-long direction is not detected, the control section 110 keeps the current image output state.

And in step S14, when the control section 110 has detected a change from the laterally-long direction to the longitudinally-long direction, the image displayed on the display panel 121 of the mobile telephone terminal apparatus 100 and the image displayed from the terminal section 170 are individually optimized (step S15). Specifically, the control section 110 changes the image displayed on the display panel 121 of the mobile telephone terminal apparatus 100 to the longitudinally-long image. Accordingly, at this time, directions of characters and figures in the image are changed by 90°. Also, the control section 110 optimizes the image output from the terminal section 170 so as to be displayed on the display panel 211 of the display unit 200. For this optimization, the status bar indicating the state of the mobile telephone terminal apparatus 100 is changed to non-display, an image having optimum display contents is produced from the size of the display panel 211 of the display unit 200 and the display ability (the number of pixels, etc.). For the image having the optimum display contents, for example, when the size of the display panel 211 of the display unit 200 is relatively large, characters and figures in the image are set to relatively small-sized characters, and the amount of information (for example, the number of characters) to be displayed is increased. Also, information omitted in the image before change may be newly displayed. A specific image display example in step S15 will be described later at the time of describing FIG. 6.

After performing optimization processing of the two images in step S15, the control section 110 will not change the display direction of the image by the detection signal of the motion sensor section 108.

And the control section 110 determines whether or not the user has performed reset operation of the current display mode (step S16). This reset operation is performed, for example, by one specific key of the operation keys 140 being pressed. Alternatively, the control section 110 may display a specific button for the reset operation in the image displayed on the display panel 121, and a determination may be made by existence or absence of a touch operation of the button.

If there is no reset operation of the current display mode by this determination, the control section 110 keeps the display state in step S15.

And in step S16, if determined that the user has performed reset operation of the current display mode, the control section 110 optimizes the image displayed on the display panel 121 of the mobile telephone terminal apparatus 100 to be displayed on the display panel 121 in the laterally-long direction (step S17). Specifically, for example, characters, figures, etc., that are displayed on the small-sized display panel 121 are disposed in such a size as recognizable by the user. Also, a status bar is disposed at an upper end of the image.

And at this time, the control section 110 causes the image to be output from the terminal section 170 of the mobile telephone terminal apparatus 100 to have the same contents as the image displayed on the display panel 121, and disposes a status bar at the upper end of the image. In this regard, a display state set in step S17 is the same as the display state set in step S13 at the time of starting image output.

After going to a state in step S17, the control section 110 returns to the determination in step S14.

FIG. 6 is a diagram illustrating an example of a change in the display image in the case of processing in accordance with the flowchart in FIG. 5.

Figure 6A:
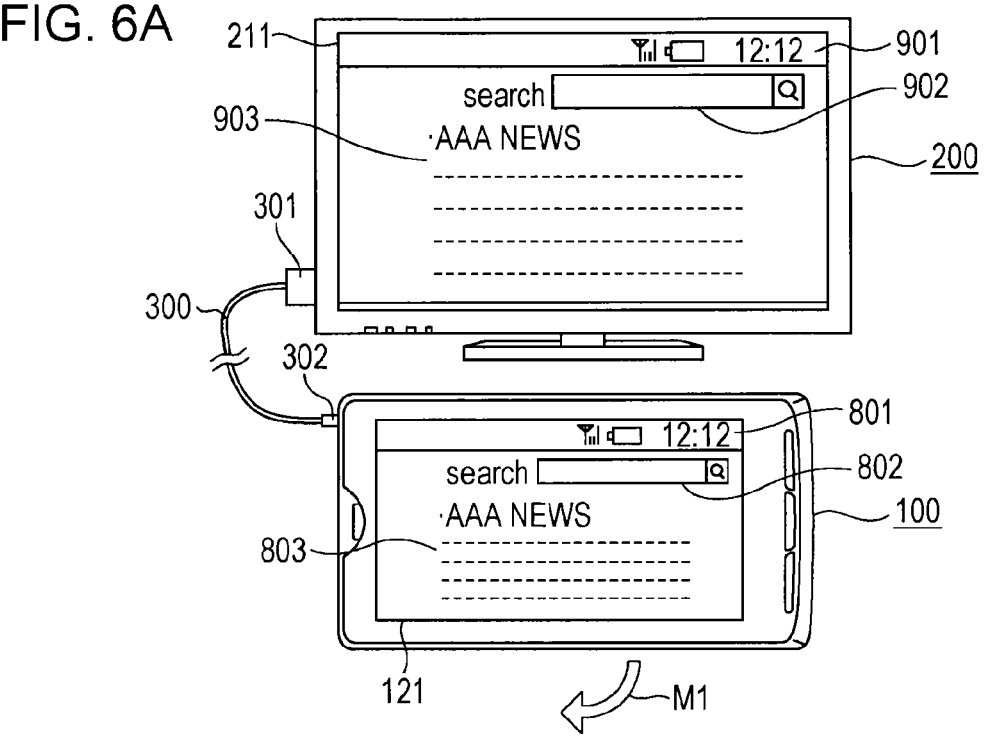
FIGS. 6A and 6B are explanatory diagrams illustrating an example of a display change by a direction of the terminal apparatus according to the first embodiment of the present disclosure.

FIG. 6A is a diagram illustrating an example of display states of the two apparatuses 100 and 200 when image output is started from the terminal section 170 in step S13 in FIG. 5. The display example illustrated in FIG. 6A is the same as the display example illustrated in FIG. 3B. That is to say, the status bar 801, the search-character input place 802, and the news display place 803, etc., which are displayed on the display panel 121 of the mobile telephone terminal apparatus 100, are displayed on the display panel 211 of the display unit 200 without change. In the example in FIG. 6A, the enlarged status bar 901, the enlarged search-character input place 902, and the enlarged news display place 903 are displayed on the display panel 211. In this regard, the display states in step S17 are also in the sate illustrated in FIG. 6A.

Figure 6B:
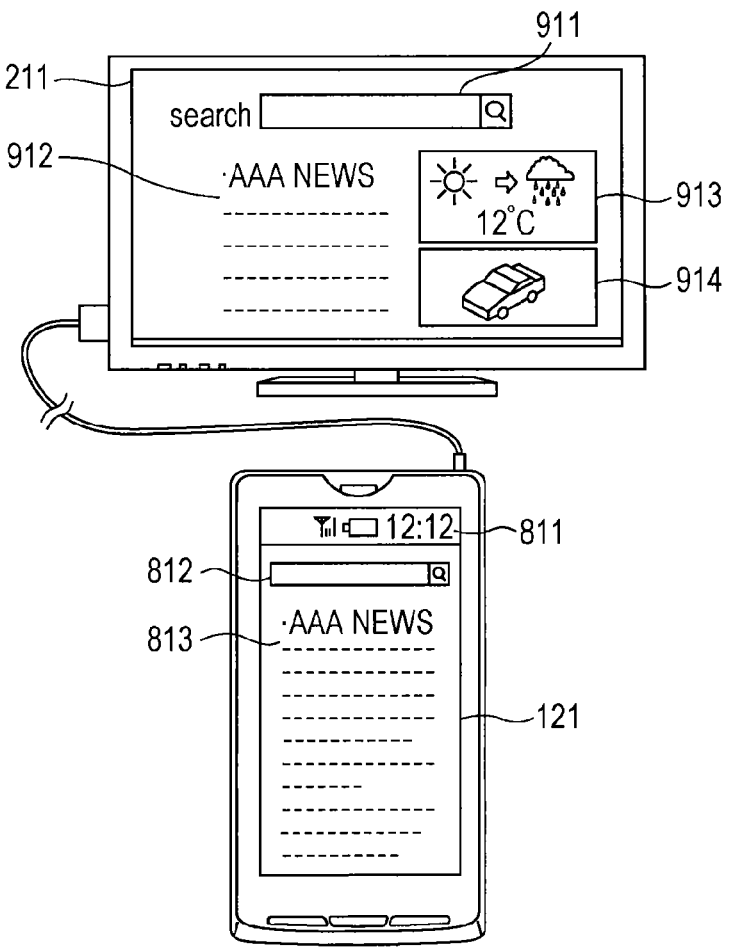

In the display state illustrated in FIG. 6A, as illustrated by an arrow M1, when the mobile telephone terminal apparatus 100 is changed from the laterally-long direction to the longitudinally-long direction, the display state is changed to the state illustrated in FIG. 6B.

That is to say, as illustrated in FIG. 6B, the image displayed on the display panel 121 of the mobile telephone terminal apparatus 100 becomes a longitudinally-long image. At this time, the display processing section 120 creates the image in which the status bar 811, the search-character input place 812, and the news display place 813, etc., are accommodated in the longitudinally-long screen.

And the image that is outputted by the terminal section 170 of the mobile telephone terminal apparatus 100 and is displayed on the display panel 211 of the display unit 200 is optimized to be displayed on the display panel 211 thereof For example, the status bar indicating the state of the mobile telephone terminal apparatus 100 is changed to non-display, and a search-character input place 911 and a news display place 912 are set into relatively small-sized characters. Also, a weather-forecast display place 913 and a news-video display place 914 are disposed in the image displayed on the display panel 211, and processing for increasing the amount of information is performed. Also, the control section 110 changes a display layout of each piece of information such that a display form of each piece of the information becomes suitable.

In this manner, when an image outputted by the mobile telephone terminal apparatus 100 is displayed on the display unit 200, the display mode is changed by the direction of the mobile telephone terminal apparatus 100 so that it is possible to optimize the individual display panels 121 and 211 with simple and favorable operation. That is to say, when the mobile telephone terminal apparatus 100 and the display unit 200 are connected, an image displayed by the mobile telephone terminal apparatus 100 compulsorily becomes a laterally-long image, and the display unit 200 displays the image having the same contents as the image of the mobile telephone terminal apparatus 100. Accordingly, at the time of starting a connection, the two apparatuses 100 and 200 display the same image so that it becomes an easy display form for the user to understand. In a state of performing the same display, the display is performed with a user interface of a screen normally displayed by the mobile telephone terminal apparatus 100, and thus it is possible for the user to operate the display screen with the same operationality as the case of performing touch operation on the single mobile telephone terminal apparatus 100, and thus favorable operation is allowed.

Besides, when the mobile telephone terminal apparatus 100 is moved from the laterally-long direction to the longitudinally-long direction, the mobile telephone terminal apparatus 100 changes to the longitudinally-long image display. Also, the image displayed on the display panel 211 of the display unit 200 is optimized to match the size and the display ability of the display panel 211. For example, the status bar indicating the state of the mobile telephone terminal apparatus 100 is not displayed on the image displayed on the display panel 211 of the display unit 200, and thus the image displayed on the display unit 200 becomes easy to view. Also, the character sizes and the display amount of information are set to match the size and the display ability of the display panel 211, and thus the image displayed on the display unit 200 becomes easy to view from this point.

And after the display state illustrated in FIG. 6B is set, unless there is a user operation of resetting the display mode, the state will not return to the display state illustrated in FIG. 6A, and thus even if the direction of the mobile telephone terminal apparatus 100 is changed temporarily, switching the display states will not occur frequently.

<2. Second Embodiment>

[2-1. Display Processing when Terminal Apparatus has Moved]

Next, a description will be given of an example of a second embodiment with reference to FIG. 7 to FIG. 13. In FIG. 7 to FIG. 13, same reference numerals are given to same parts as those in FIG. 1 to FIG. 6, described in the first embodiment before, and the detailed description will be omitted.

In the example in the second embodiment, when the mobile telephone terminal apparatus 100 and the display unit 200 are connected, and the direction of the mobile telephone terminal apparatus 100 is changed, the display performed by the display panel 121 of the mobile telephone terminal apparatus 100 is different from that of the first embodiment. The configurations illustrated in FIG. 1 and FIG. 2, which were described in the first embodiment before, are applied to the configurations of the mobile telephone terminal apparatus 100 and the display unit 200.

A flowchart in FIG. 7 is a diagram illustrating processing performed by the control section 110 in the second embodiment. In the flowchart in FIG. 7, processing from step S21 to step S24 is the same as the processing from step S11 to step S14 in the flowchart in FIG. 5.

And when the control section 110 has detected a change from the laterally-long direction to the longitudinally-long direction in step S24, the image displayed on the display panel 121 of the mobile telephone terminal apparatus 100 is changed to a control screen. Also, the image outputted from the terminal section 170 is optimized for the display unit 200 (step S25).

That is to say, the control section 110 changes the image displayed on the display panel 121 of the mobile telephone terminal apparatus 100 to the image of the control screen for performing various operations by touch operation. The status bar is also displayed on this control screen.

And the control section 110 optimizes the image outputted from the terminal section 170 so as to be displayed on the display panel 211 of the display unit 200. For this optimization, for example, the same processing as that described in step S15 of the flowchart in FIG. 5 in the first embodiment can be applied. Specifically, the status bar indicating the state of the mobile telephone terminal apparatus 100 is changed to non-display, and the image having the optimum display contents is displayed from the size and the display ability (the number of pixels, etc.) of the display panel 211 of the display unit 200.

After that, the control section 110 determines whether or not the touch panel section 130 of the mobile telephone terminal apparatus 100 has detected a touch operation (step S26). Here, if a touch operation has not been detected, the control section 110 waits until a touch operation is detected.

And when a touch operation is detected in step S26, the control section 110 detects whether the touch operation is a touch operation on the button for closing the control screen or not (step S27). Here, if the control section 110 determined that the touch operation is not a touch operation on the button for closing the control screen, the control section 110 performs input processing on the basis of the touch operation at that time (step S28). The input processing in step S28 corresponds to a button on the control screen being displayed or a touch pad. After performing the input processing on the basis of the touch operation, the control section 110 returns to the determination in step S26.

And in step S28, when the touch operation for closing the control screen is detected, the control section 110 optimizes the image to be displayed on the display panel 121 of the mobile telephone terminal apparatus 100 to an image in the laterally-long direction on the display panel 121 (step S29). Specifically, for example, characters, figures, etc., to be displayed on the small-sized display panel 121 are changed into the sizes and the disposition that are substantially recognizable for the user. Also, a status bar is disposed at the upper end of the image.

And at this time, the control section 110 changes the image outputted from the terminal section 170 of the mobile telephone terminal apparatus 100 to the image having the same contents as the image displayed on the display panel 121, and the status bar is disposed at the upper end of the image. In this regard, the display state set in step S29 is the same as the display state set in step S23 at the time of starting the image output.

After setting the state in step S29, the control section 110 returns the determination processing in step S24.

Figure 8A:
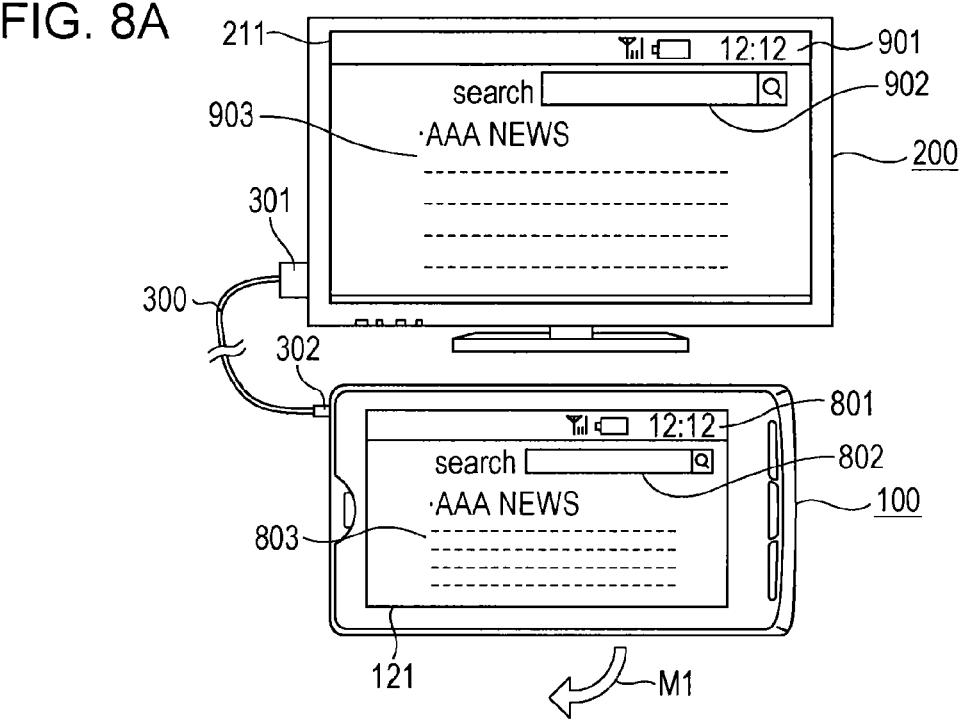
FIGS. 8A and 8B are explanatory diagrams illustrating an example of a display change by a direction of the terminal apparatus according to the second embodiment of the present disclosure.
Figure 8B:
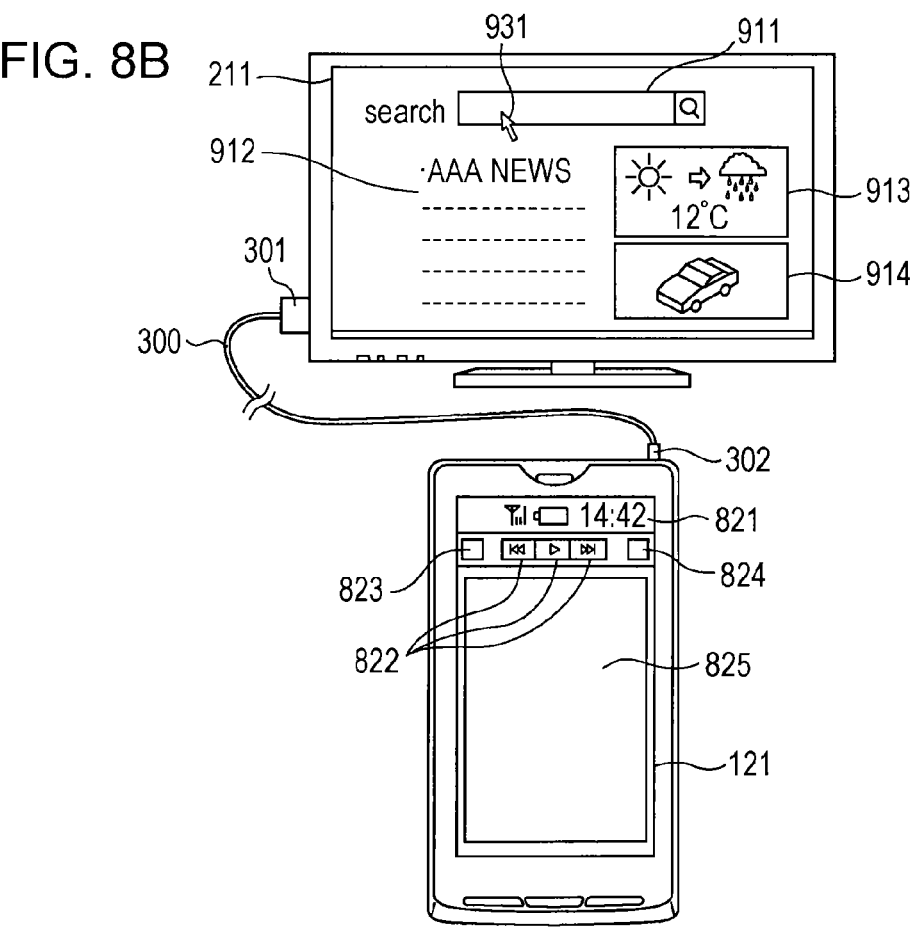

FIGS. 8A and 8B are diagrams illustrating an example of changing a display image in the case of processing in accordance with the flowchart in FIG. 6.

FIG. 8A is a diagram illustrating an example of display states of the two apparatuses 100 and 200 at the time of starting an image output from the terminal section 170 in step S23 in FIG. 7. The display example illustrated in FIG. 8A is the same as the display example illustrated in FIG. 3B and FIG. 6A. That is to say, the status bar 801, the search-character input place 802, and the news display place 803, etc., which are displayed on the display panel 121 of the mobile telephone terminal apparatus 100, are displayed on the display panel 211 of the display unit 200 without change. In this regard, the display state in step S29 is also the state illustrated in FIG. 8A.

In the display state illustrated in FIG. 8A, as illustrated by an arrow Ml, when the mobile telephone terminal apparatus 100 is changed from the laterally-long direction to the longitudinally-long direction, the display state changes into the display state illustrated in FIG. 8B.

That is to say, as illustrated in FIG. 8B, the display panel 121 of the mobile telephone terminal apparatus 100 is changed into the image of the control screen. In the example in FIG. 8B, the entire control screen is disposed in a longitudinally-long manner, and the upper end of the display panel 121 displays the status bar 821. On the control screen, buttons 822, 823 and 824 that instruct various operations are displayed by being disposed in a line under the status bar 821. And an area excluding the upper part in which these buttons 822 to 824 are disposed becomes an area of a touch pad 825. In this regard, among a plurality of the displayed buttons 822 to 824, one of the buttons 823 is assigned to a button for closing the control screen. Also, the other of the buttons 824 is assigned to a button for changing the control screen to another display mode.

The touch pad 825 is an area for moving a cursor in the screen in accordance with touched movement, for example, by a finger, etc. That is to say, as illustrated in FIG. 8B, the control section 110 displays a cursor 931, such as an arrow, in the image displayed on the display panel 211 of the display unit 200. And the control section 110 changes a display position of the cursor 931 by movement detected on the area of the touch pad 825.

And, as illustrated in FIG. 8B, the image outputted by the terminal section 170 of the mobile telephone terminal apparatus 100, and displayed on the display panel 211 of the display unit 200 is optimized to be displayed on the display panel 211. The optimization of the image displayed in FIG. 8B is the same as the image displayed in FIG. 6B. However, the case of the example in FIG. 8B is different from the example in FIG. 6B in the point that the above-described cursor 931 is displayed in the display panel 211. At the position of this cursor 931, a touch operation by the user is performed on the touch pad 825.

In this manner, when the image outputted by the mobile telephone terminal apparatus 100 is displayed on the display unit 200, the control screen for performing various operations is displayed by the direction of the mobile telephone terminal apparatus 100, thereby making it possible to improve operationality of the operation related to the screen being displayed on the display unit 200. That is to say, when the user only moves the mobile telephone terminal apparatus 100 from the laterally-long direction to the longitudinally-long direction, the control screen can be automatically displayed, and thus the control screen can be displayed easily. In particular, at the time of performing cursor move operation using the touch pad 825, it is not necessary for the user to view the display on the display panel 121 on the mobile telephone terminal apparatus 100, and thus the user is allowed to operate favorably.

Also, after the control screen is displayed, unless there is a user operation to close the display, the display state is not returned to the display state illustrated in FIG. 8A, and thus even if the direction of the mobile telephone terminal apparatus 100 is temporarily changed, switching the display state will not occur frequently.

[2-2. Another Example of Control Screen]

The control screen illustrated in FIG. 8B is an example of the control screen, and another control screen may be displayed.

Figure 9A:
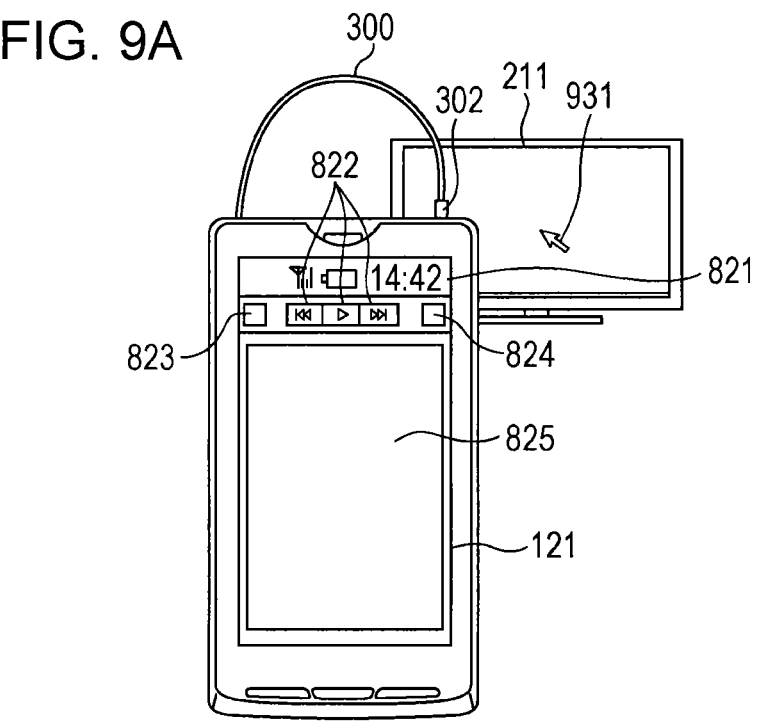
FIGS. 9A and 9B are explanatory diagrams illustrating a display example of a control screen of the terminal apparatus according to the second embodiment of the present disclosure.

For example, as illustrated in FIG. 9A, in a state in which the display panel 121 of the mobile telephone terminal apparatus 100 displays the control screen, it is assumed that the button 824 that changes the control screen to another display mode is touched by the user's finger, etc.

Figure 9B:
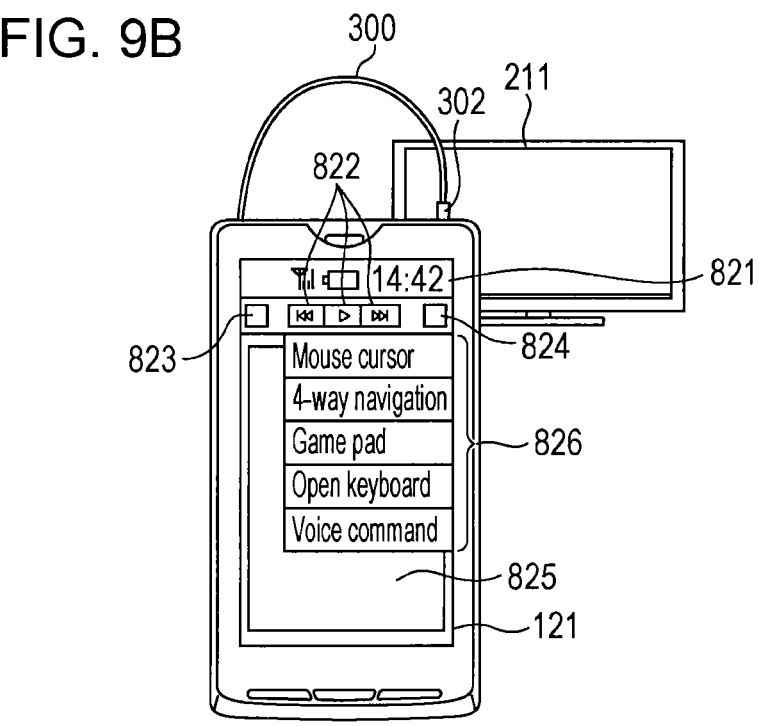

At this time, as illustrated in FIG. 9B, on the display panel 121, a selection screen 826 of the display screen is displayed below the button 824 as a pull-down menu. The user selects any one of the items displayed as the selection screen 826 by touch operation so that the display is changed to the corresponding control screen.

Figure 10:
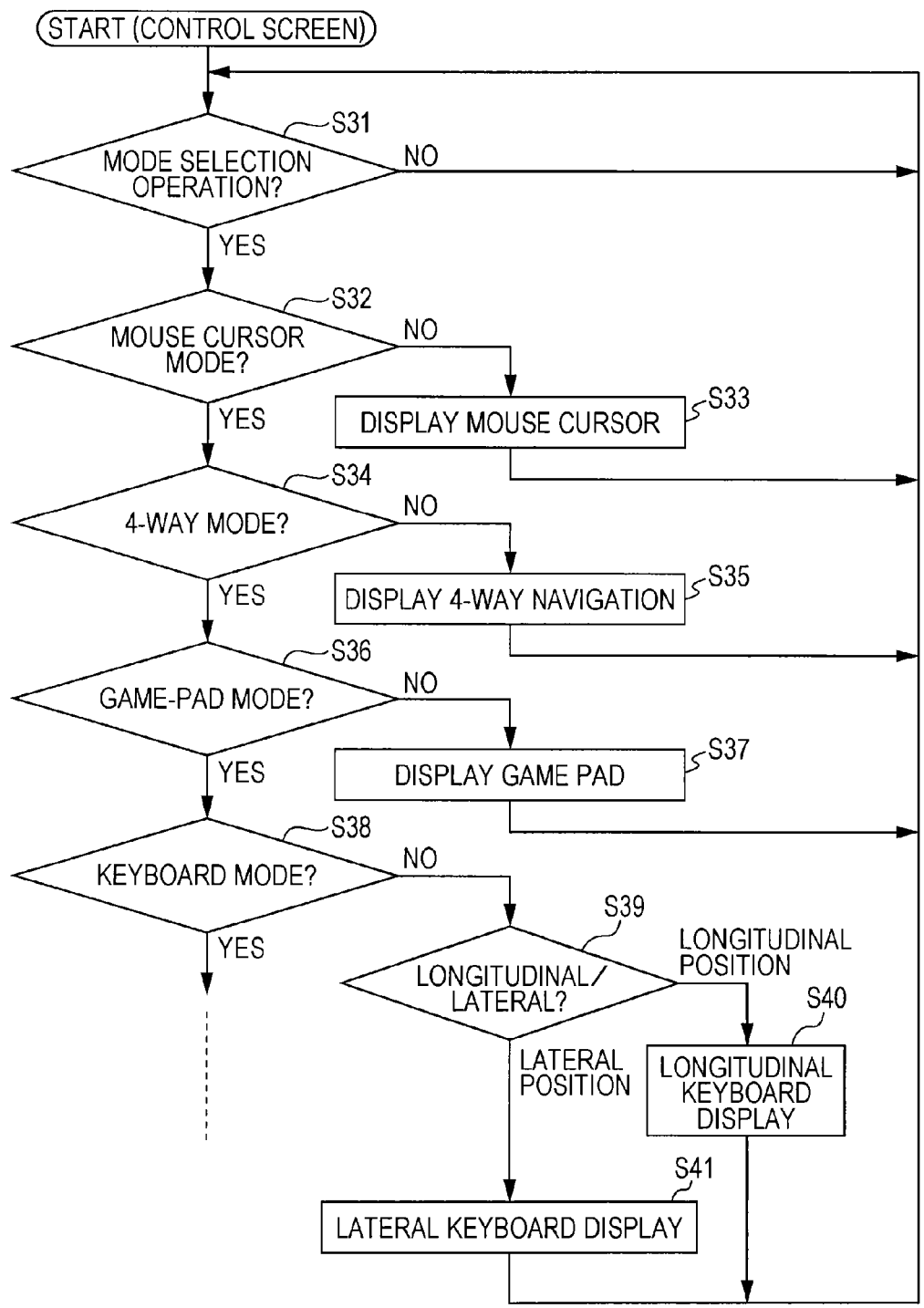
FIG. 10 is a flowchart illustrating an example of selecting a control screen of the terminal apparatus according to the second embodiment of the present disclosure.

A flowchart in FIG. 10 is a diagram illustrating an example of the selection processing at the time of selecting the control screen. First, the control section 110 determines whether there is a mode selection operation by the operation of the button 824 illustrated in FIG. 9 or not (step S31). By this determination, if there is a mode selection operation, the control section 110 displays the selection screen 826 illustrated in FIG. 9B. And the control section 110 determines whether or not a mouse cursor mode is selected from the selection screen 826 (step S32). Here, if the mouse cursor mode is selected, the control section 110 displays a control screen in the mouse cursor mode on the display panel 121 (step S33). The control screen in the mouse cursor mode is the control screen displayed on the display panel 121 illustrated in FIG. 9B.

Also, in step S32, if determined that the selection is not the mouse cursor mode, the control section 110 determines whether a 4-way mode was selected or not (step S34). Here, if the 4-way navigation mode was selected, the control section 110 displays a control screen in the 4-way navigation mode on the display panel 121 (step S35).

Also, in step S34, if determined that the 4-way navigation mode was not selected, the control section 110 determines whether a game-pad mode has been selected or not (step S36). Here, if the game-pad mode has been selected, the control section 110 displays a game-pad mode control screen on the display panel 121 (step S37).

Also, in step S36, if determined that the game-pad mode has not been selected, the control section 110 determines whether or not a keyboard mode has been selected (step S38). Here, if the keyboard mode has been selected, the control section 110 determines whether the direction of the current mobile telephone terminal apparatus 100 is longitudinally long or laterally long (step S39). Here, if determined that the direction is longitudinally long, the control section 110 displays a keyboard for longitudinally long on the display panel 121 (step S40). Also, if determined that the direction is laterally long, the display panel 121 displays a keyboard for laterally long (step S41).

Further, in step S38, if determined the keyboard mode has not been determined, the control section 110 further determines whether or not in another mode.

And after performing display in the individual modes in steps S33, S35, S37, S40, and S41, the control section 110 returns a determination of whether there is mode selection operation or not in step S31.

Figure 11:
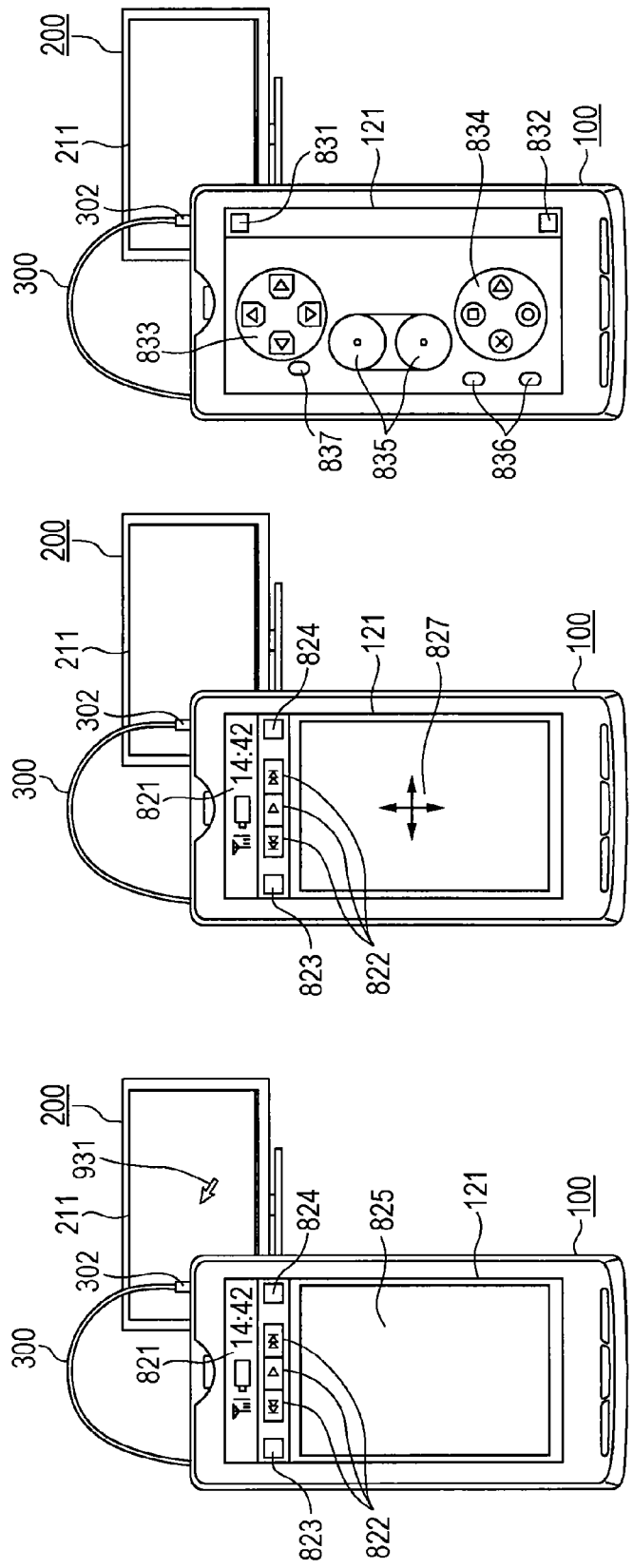
FIGS. 11A-11C are explanatory diagrams illustrating another example of a control screen of the terminal apparatus according to the second embodiment of the present disclosure.

FIG. 11 is a diagram illustrating an example of a display screen in each of the modes.

FIG. 11A is a diagram illustrating the control screen in the mouse cursor mode. The control screen in this mouse cursor mode is the screen that has already been described in FIG. 8B. On this control screen, a position of the cursor 931, etc., displayed on the display panel 211 of the display unit 200 is controlled on the basis of the touch operation.

FIG. 11B is an example illustrating the control screen in the 4-way navigation mode. In this case, on the display panel 121, a mark 827 corresponding to a cross-key is displayed substantially in the middle. Also, the buttons 822 to 824 are displayed on the display panel 121 in the same manner as in the mouse cursor mode. And when an upper side of the mark 827 is touched, a selected position on the display panel 211 of the display unit 200 is changed to an upper side than a position before the touch operation. In the same manner, when a lower side, a left side, or a right side of the mark 827 is touched, a selected position on the display panel 211 of the display unit 200 is changed to a lower side, a left side, or a right side.

FIG. 11C is a diagram illustrating an example of a control screen in the game-pad mode. In this case, the display panel 121 displays various buttons 833 to 837 simulating key disposition of a control unit for a video game machine. The control screen of this game-pad mode is assumed to be a display mode in which the display panel 121 is used in the laterally-long manner. Also, the display panel 121 displays a button 831, which closes the control screen, and a button 832, which changes the control screen to another display mode. In this regard, a status bar is not displayed on the control screen in this game-pad mode.

The control screen in this game-pad mode is displayed on the display panel 121 so that the user can perform game operation by touch operation on the display panel 121 of the mobile telephone terminal apparatus 100 while displaying the execution screen of the video game on the display panel 211 of the display unit 200.

In this regard, the control screen in the game-pad mode, illustrated in FIG. 11C, may be automatically displayed, for example, by detection of a change in the direction of the mobile telephone terminal apparatus 100 after the connection to the display unit 200 when the control section 110 of the mobile telephone terminal apparatus 100 executes the video game.

Figure 12:
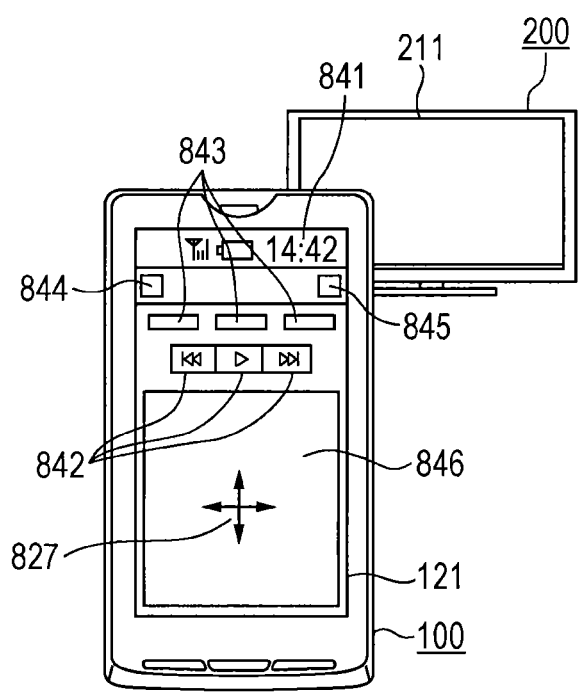
FIG. 12 is an explanatory diagram illustrating still another example of a control screen of the terminal apparatus according to the second embodiment of the present disclosure.

FIG. 12 is a diagram illustrating an example of still another control screen. The control screen illustrated in FIG. 12 is a control screen for playing back music. For example, while the control section 110 of the mobile telephone terminal apparatus 100 is starting the music playback program, when the display unit 200 is connected, and a change in the direction of the mobile telephone terminal apparatus 100 is detected, the control section 110 displays the control screen for playing back music, illustrated in FIG. 12.

In the control screen for playing back music, illustrated in FIG. 12, the display panel 121 displays a status bar 841 at an upper end, and a button 842 that instructs playback and forwarding and a button 843 that instructs various music selection lists are displayed in an upper-half area. Also, the display panel 121 displays a button 844 closing the control screen, and a button 845 changing the control screen to another display mode are displayed. Further, the display panel 121 displays a mark 827 corresponding to a cross-key in a lower-half area. By performing touch operation on a surrounding area of the mark 827, forwarding, or volume adjustment, etc., is performed.

[2-3. Example of Keyboard Screen]

FIG. 13 is a display example when the keyboard mode is selected in step S38 in the flowchart in FIG. 10.

Figure 13A:
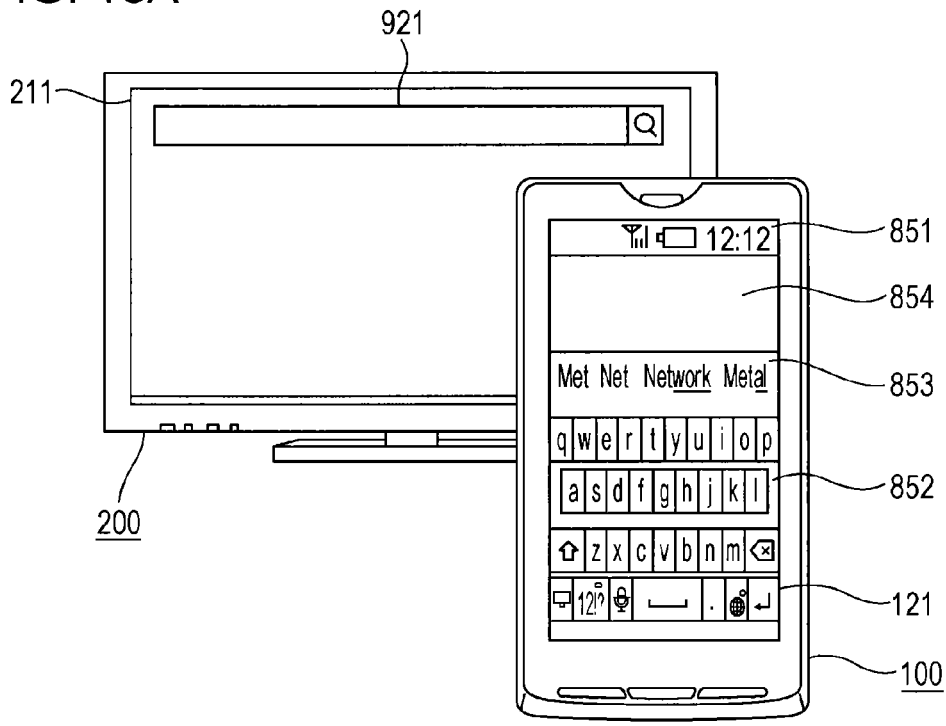
FIGS. 13A and 13B are explanatory diagrams illustrating an example of a keyboard screen of the terminal apparatus according to the second embodiment of the present disclosure.
Figure 13B:
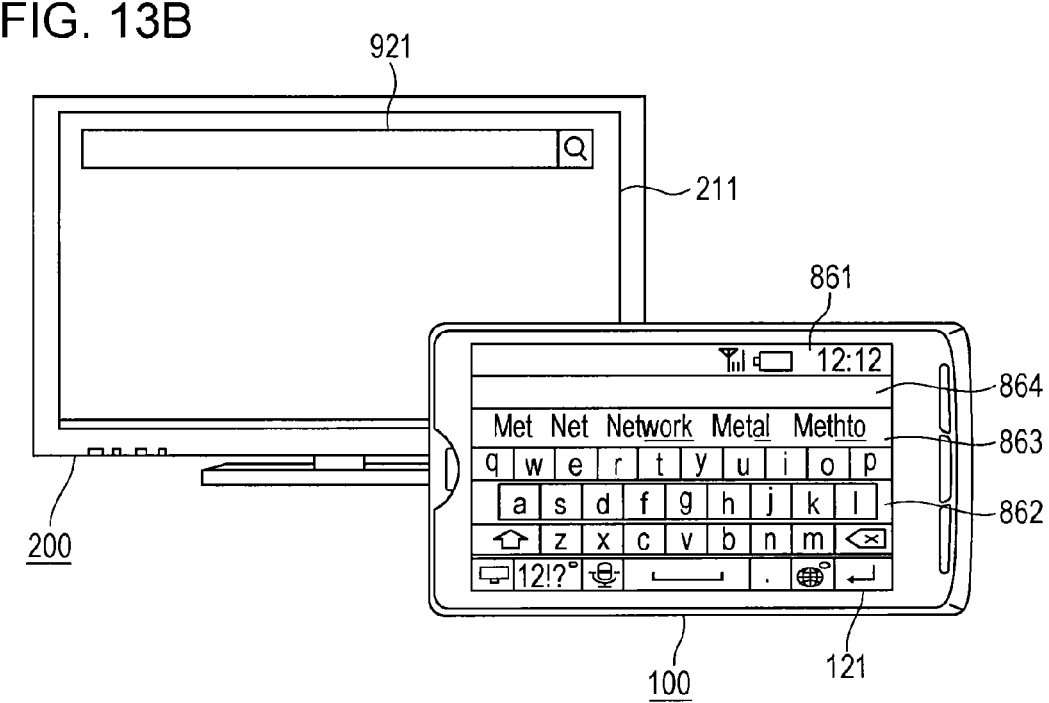

In the keyboard mode, there are a case in which the display panel 121 displays a longitudinally-long keyboard (FIG. 13A) and a case in which the display panel 121 displays a laterally-long keyboard (FIG. 13B).

In the case of displaying the longitudinally-long keyboard, as illustrated in FIG. 13A, the display panel 121 displays a status bar 851 at an upper end, and displays a keyboard 852 corresponding to characters and numerals, such as alphabets, etc., in a longitudinally-long manner. Also, an input-candidate-character display area 853 and an input-determined-character display area 854 are displayed. And characters displayed in the input-determined-character display area 854 are displayed in a character input place 921, which is displayed on the display panel 211 of the display unit 200.

In the case of displaying the laterally-long keyboard, as illustrated in FIG. 13B, the display panel 121 displays a status bar 861 at an upper end, and displays a keyboard 862 corresponding to characters and numerals, such as alphabets, etc., in a laterally-long manner. Also, an input-candidate-character display area 863 and an input-determined-character display area 864 are displayed. And the characters displayed in the input-determined-character display area 864 are displayed in the character input place 921, which is displayed on the display panel 211 of the display unit 200.

In this regard, for example, when the character input place 921 displayed on the display panel 211 of the display unit 200 is selected by a cursor (for example, the cursor 931 in FIG. 11A), etc., these keyboards may be automatically displayed under the control of the control section 110.

<3. Variations>

In this regard, each of the display examples of the screens illustrated in the individual figures is one example, and may be displayed in another display manner. Also, in the example illustrated in FIG. 8B, when the display panel 121 of the mobile telephone terminal apparatus 100 displays the control screen, the display on the display panel 211 of the display unit 200 is optimized for the display unit 200. On the other hand, when the display panel 121 of the mobile telephone terminal apparatus 100 displays the control screen, the image displayed by the display panel 211 of the display unit 200 may continue the preceding display state illustrated in FIG. 8A. Alternatively, only the status bar 901 may be deleted.

Also, in the above-described embodiments, descriptions have been given of the case of connecting the mobile telephone terminal apparatus 100, which is formed as a smart phone, and the display unit 200, which is formed as a television receiver. On the other hand, the present disclosure may be applied to the case of connecting the other terminal apparatus and a display unit.

Further, as illustrated in FIG. 4, in the case of connecting the terminal apparatus and the display unit, in place of connecting by a wired transmission cable, wireless transmission may be used, and the same display processing may be performed by a change in the direction of the terminal apparatus, which becomes a transmission source of the image through wireless transmission.

Also, a program (software) performing display control processing, which was described by flowcharts in FIG. 5 and FIG. 7, may be created, and the program may be stored in a recording medium. By providing the program stored in the recording medium, the terminal apparatus, in which the program has been installed, becomes a terminal apparatus that performs the processing according to the present disclosure.

Also, the configurations and processing described in the claims of the present disclosure are not limited to the examples of the above-described embodiments. It will be understood as a matter of course by those skilled in the art that various alterations, combinations, and the other embodiments may arise depending on design or the other elements as long as they are within the scope of the claims or the equivalents thereof In this regard, the present disclosure can be configured as follows.

(1) An information processing apparatus, including: a display disposed on a casing; circuitry configured to process an image displayed on the display; and an interface configured to externally output the image displayed on the display; and a motion sensor configured to detect an orientation of the casing, wherein the circuitry is configured to detect a predetermined change in orientation of the casing based on an output of the motion sensor, and generate different images as the image displayed on the display and the image output by the interface as a result of the detected predetermined change of orientation of the casing.

(2) The information processing apparatus of (1), wherein the display includes a quadrilateral display screen having one of sides as a long side and the other of the sides as a short side.

(3) The information processing apparatus of (2), wherein the circuitry is configured to: detect a change in orientation of the long side of the display from a substantially horizontal state to a substantially vertical state based on the output of the motion sensor; and change the image displayed on the display and the image output by the interface from images having same information to images having different information.

(4) The information processing apparatus of any of (1) to (3), further including: a touch panel disposed on or integrally formed with the display.

(5) The information processing apparatus of (4), wherein the circuitry is configured to generate different images as the image displayed on the display and the image output by the interface by changing the image displayed on the display to a control image for operating on the touch panel.

(6) The information processing apparatus of (5), wherein the circuitry is configured to: detect a predetermined touch input received at the touch panel based on an output of the touch panel; control the display to change the image displayed on the display to an image of a keyboard; and detect an input to a key of the displayed image of the keyboard based on an output of the touch panel.

(7) The information processing apparatus of (6), wherein the circuitry is configured to set a display direction of the keyboard based on an orientation of the housing detected based on the output of the motion sensor.

(8) The information processing apparatus of any of (5) to (7), wherein the circuitry is configured to: detect a touch input requesting to close the control image based on an output of the touch panel; and control the image displayed on the display to be a same image as the image output by the interface based on a result of the detection of the touch input requesting to close the control image.

(9) The information processing apparatus of any of (1) to (8), wherein the circuitry is configured to generate different images as the image displayed on the display and the image output by the interface by changing the image output by the interface to an image suitable to be displayed on a display larger in size than the display panel disposed on the casing.

(10) The information processing apparatus of any of (1) to (9), wherein the circuitry is configured to generate different images as the image displayed on the display and the image output by the interface by controlling the display to display a status indicating a state of the information processing apparatus on the image displayed on the display disposed on the casing, and not to include the status on the image output by the interface.

(11) A non-transitory computer-readable medium including computer-program instructions, which when executed by an information processing apparatus, causes the information processing apparatus to: control a display disposed on a casing of the information processing apparatus to display an image; output, by a communication interface, the image displayed on the display; detect an orientation of the casing; and generate different images as the image displayed on the display and the image output by the communication interface when a predetermined change of orientation of the casing is detected.

(12) A method performed by an information processing apparatus, the method comprising: controlling a display disposed on a casing of the information processing apparatus to display an image; outputting, by a communication interface of the information processing apparatus, the image displayed on the display; detecting an orientation of the casing; and generating different images as the image displayed on the display and the image output by the communication interface when a predetermined change of orientation of the casing is detected.

The invention claimed is:

1. An information processing apparatus, comprising:
   a display disposed on a casing, the display having a long direction and a short direction;
   a touch panel disposed on or integrally formed with the display; and
   circuitry configured to
   process an image displayed on the display;
   externally output the image displayed on the display to an external display device;
   detect an orientation of the casing;
   detect a predetermined change in the orientation of the casing based on the detected orientation;
   generate different images as the image displayed on the display and the image output to the external display device as a result of the detected predetermined change in the orientation of the casing by changing the image displayed on the display to a control image for operating on the touch panel;
   detect a touch input requesting to close the control image based on an output of the touch panel; and
   control the image displayed on the display to be a same image as the image output to the external display device based on a result of the detection of the touch input requesting to close the control image.

2. The information processing apparatus of claim 1, wherein
   the display includes a quadrilateral display screen having one of sides as a long side in the long direction of the display and the other of the sides as a short side in the short direction of the display.

3. The information processing apparatus of claim 1, wherein
   the circuitry is configured to:
   detect a predetermined touch input received at the touch panel based on an output of the touch panel;
   control the display to change the image displayed on the display to an image of a keyboard; and
   detect an input to a key of the displayed image of the keyboard based on an output of the touch panel.

4. The information processing apparatus of claim 3, wherein
   the circuitry is configured to set a display direction of the keyboard based on the detected orientation of the casing.

5. The information processing apparatus of claim 1, wherein the circuitry is configured to generate different images as the image displayed on the display and the image output to the external display device by changing the image output to the external display device to an image suitable to be displayed on a display larger in size than the display disposed on the casing.

6. The information processing apparatus of claim 1, wherein
   the circuitry is configured to generate the different images as the image displayed on the display and the image output to the external display device by controlling the display to display a status indicating a state of the information processing apparatus on the image displayed on the display disposed on the casing, and not to include the status on the image output to the external display device.

7. A non-transitory computer-readable medium including computer-program instructions, which when executed by an information processing apparatus, causes the information processing apparatus to:
   control a display disposed on a casing of the information processing apparatus to display an image;
   output, by circuitry, the image displayed on the display to an external display device;
   detect an orientation of the casing;
   detect a predetermined change in the orientation of the casing based on the detected orientation;
   generate different images as the image displayed on the display and the image output to the external display device when the predetermined change of the orientation of the casing is detected by changing the image displayed on the display to a control image for operating on a touch panel that is disposed on or integrally formed with the display;
   detect a touch input requesting to close the control image based on an output of the touch panel; and
   control the image displayed on the display to be a same image as the image output to the external display device based on a result of the detection of the touch input requesting to close the control image.

8. A method performed by an information processing apparatus, the method comprising:
   controlling a display disposed on a casing of the information processing apparatus to display an image;
   outputting, by circuitry of the information processing apparatus, the image display on the display to an external display device;
   detecting an orientation of the casing;
   detecting a predetermined change in the orientation of the casing based on the detected orientation;
   generating different images as the image displayed on the display and the image output to the external display device when the predetermined change of the orientation of the casing is detected by changing the image displayed on the display to a control image for operating on a touch panel that is disposed on or integrally formed with the display;
   detecting a touch input requesting to close the control image based on an output of the touch panel; and
   controlling the image displayed on the display to be a same image as the image output to the external display device based on a result of the detection of the touch input requesting to close the control image.

* * * * *